United States Patent
Lesner et al.

(10) Patent No.: US 10,572,607 B1
(45) Date of Patent: Feb. 25, 2020

(54) TRANSLATING TRANSACTION DESCRIPTIONS USING MACHINE LEARNING

(71) Applicants: Christopher Lesner, Palo Alto, CA (US); Alexander S. Ran, Palo Alto, CA (US); Marko Sasa Rukonic, San Jose, CA (US); Wei Wang, San Jose, CA (US)

(72) Inventors: Christopher Lesner, Palo Alto, CA (US); Alexander S. Ran, Palo Alto, CA (US); Marko Sasa Rukonic, San Jose, CA (US); Wei Wang, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 16/144,863

(22) Filed: Sep. 27, 2018

(51) Int. Cl.
*G06F 17/28* (2006.01)
*G06F 17/27* (2006.01)
*G06N 20/00* (2019.01)

(52) U.S. Cl.
CPC ........ *G06F 17/289* (2013.01); *G06F 17/2735* (2013.01); *G06F 17/2854* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 9,348,815 | B1* | 5/2016 | Estes | G06F 17/2785 |
| 2005/0027664 | A1* | 2/2005 | Johnson | G06F 17/2827 |
| | | | | 706/12 |
| 2010/0153187 | A1* | 6/2010 | Ghani | G06Q 30/02 |
| | | | | 705/14.53 |
| 2012/0179453 | A1* | 7/2012 | Ghani | G06F 17/27 |
| | | | | 704/9 |
| 2012/0290376 | A1* | 11/2012 | Dryer | G06Q 20/3278 |
| | | | | 705/14.23 |

(Continued)

OTHER PUBLICATIONS

Chorowski, J. et al., "Towards Better Decoding and Language Model Integration in Sequence to Sequence Models", Computer Science—Neural and Evolutionary Computing; arXiv:1612.02695v1 [cs.NE] Dec. 8, 2016 (6 pages).

*Primary Examiner* — Jonathan C Kim
(74) *Attorney, Agent, or Firm* — Ferguson Braswell Fraser Kubasta PC

(57) ABSTRACT

A method may include generating a source transaction description, encoding, by an encoder model of a machine translation model executing on a computer processor, the source transaction description to create a context vector, decoding, by a decoder model of the machine translation model, the context vector to predict a target entity description, generating a transaction including the target entity description, detecting an acceptance, by a user, of an action performed on the transaction, in response to detecting the acceptance, updating a translation accuracy metric for the target entity description, determining that the updated translation accuracy metric satisfies a translation accuracy criterion, and in response to determining that the updated translation accuracy metric satisfies the translation accuracy criterion, adding the target entity description to golden entity descriptions.

17 Claims, 11 Drawing Sheets

(56) References Cited

U.S. PATENT DOCUMENTS

| | | | |
|---|---|---|---|
| 2013/0282626 A1* | 10/2013 | White | G06O 30/0201 706/11 |
| 2014/0012724 A1* | 1/2014 | O'leary | G06Q 20/4016 705/35 |
| 2015/0127659 A1* | 5/2015 | Madhani | G06K 9/00442 707/748 |
| 2015/0169745 A1* | 6/2015 | Morimoto | G06Q 10/10 707/730 |
| 2016/0086222 A1* | 3/2016 | Kurapati | G06Q 30/0204 705/14.53 |
| 2016/0371255 A1* | 12/2016 | Desai | G06F 16/22 |
| 2017/0031894 A1* | 2/2017 | Bettersworth | G06F 17/277 |
| 2017/0060848 A1* | 3/2017 | Liu | G06F 17/28 |
| 2018/0082183 A1* | 3/2018 | Hertz | G06Q 10/10 |
| 2018/0260472 A1* | 9/2018 | Kelsey | G06F 16/3329 |
| 2019/0080627 A1* | 3/2019 | Dey | G09B 5/12 |
| 2019/0278846 A1* | 9/2019 | Xiang | G06F 16/00 |

\* cited by examiner

TRANSLATING TRANSACTION DESCRIPTIONS USING MACHINE LEARNING

BACKGROUND

Automated download of transactions (e.g., financial transactions) is a useful feature of online business management applications. One obstacle to using downloaded transactions is the variable format of their descriptions, which may vary widely across different transaction sources. Different transaction sources may use different representations of values such as entity names, locations, times, etc. In the case of financial transactions, due to this variability, even the same location of a single entity may be represented using a large number of different formats, depending on which payment method was used (e.g., debit card, Visa, MasterCard, etc.), which payment networks handled the transaction, and which financial institution recorded the transaction. Large dictionaries of commonly used transaction description keywords may be used to address the variable transaction format problem. However, the usefulness of such dictionaries tends to limited to a specific language (e.g., English).

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including generating a source transaction description, encoding, by an encoder model of a machine translation model executing on a computer processor, the source transaction description to create a context vector, decoding, by a decoder model of the machine translation model, the context vector to predict a target entity description, generating a transaction including the target entity description, detecting an acceptance, by a user, of an action performed on the transaction, in response to detecting the acceptance, updating a translation accuracy metric for the target entity description, determining that the updated translation accuracy metric satisfies a translation accuracy criterion, and in response to determining that the updated translation accuracy metric satisfies the translation accuracy criterion, adding the target entity description to golden entity descriptions.

In general, in one aspect, one or more embodiments relate to a system including a repository including a source transaction description, a target entity description, a transaction including the target entity description, a translation accuracy metric for the target entity description, and golden entity descriptions, a memory coupled to a computer processor, and a machine translation model executing on the computer processor and using the memory. The machine translation model includes an encoder model configured to encode the source transaction description to create a context vector, and a decoder model configured to decode the context vector to predict the target entity description. The system further includes a translation manager executing on the computer processor and using the memory, configured to generate the source transaction description, generate the transaction, detect an acceptance, by a user, of an action performed on the transaction, in response to detecting the acceptance, update the translation accuracy metric for the target entity description, determine that the updated translation accuracy metric satisfies a translation accuracy criterion, and in response to determining that the updated translation accuracy metric satisfies the translation accuracy criterion, add the target entity description to the golden entity descriptions.

In general, in one aspect, one or more embodiments relate to a non-transitory computer readable medium including instructions that, when executed by a processor, perform: generating a source transaction description, encoding, by an encoder model of a machine translation model executing on a computer processor, the source transaction description to create a context vector, decoding, by a decoder model of the machine translation model, the context vector to predict a target entity description, generating a transaction including the target entity description, detecting an acceptance, by a user, of an action performed on the transaction, in response to detecting the acceptance, updating a translation accuracy metric for the target entity description, determining that the updated translation accuracy metric satisfies a translation accuracy criterion, and in response to determining that the updated translation accuracy metric satisfies the translation accuracy criterion, adding the target entity description to golden entity descriptions.

Other aspects of the invention will be apparent from the following description and the appended claims.

DETAILED DESCRIPTION

Figure 1A:
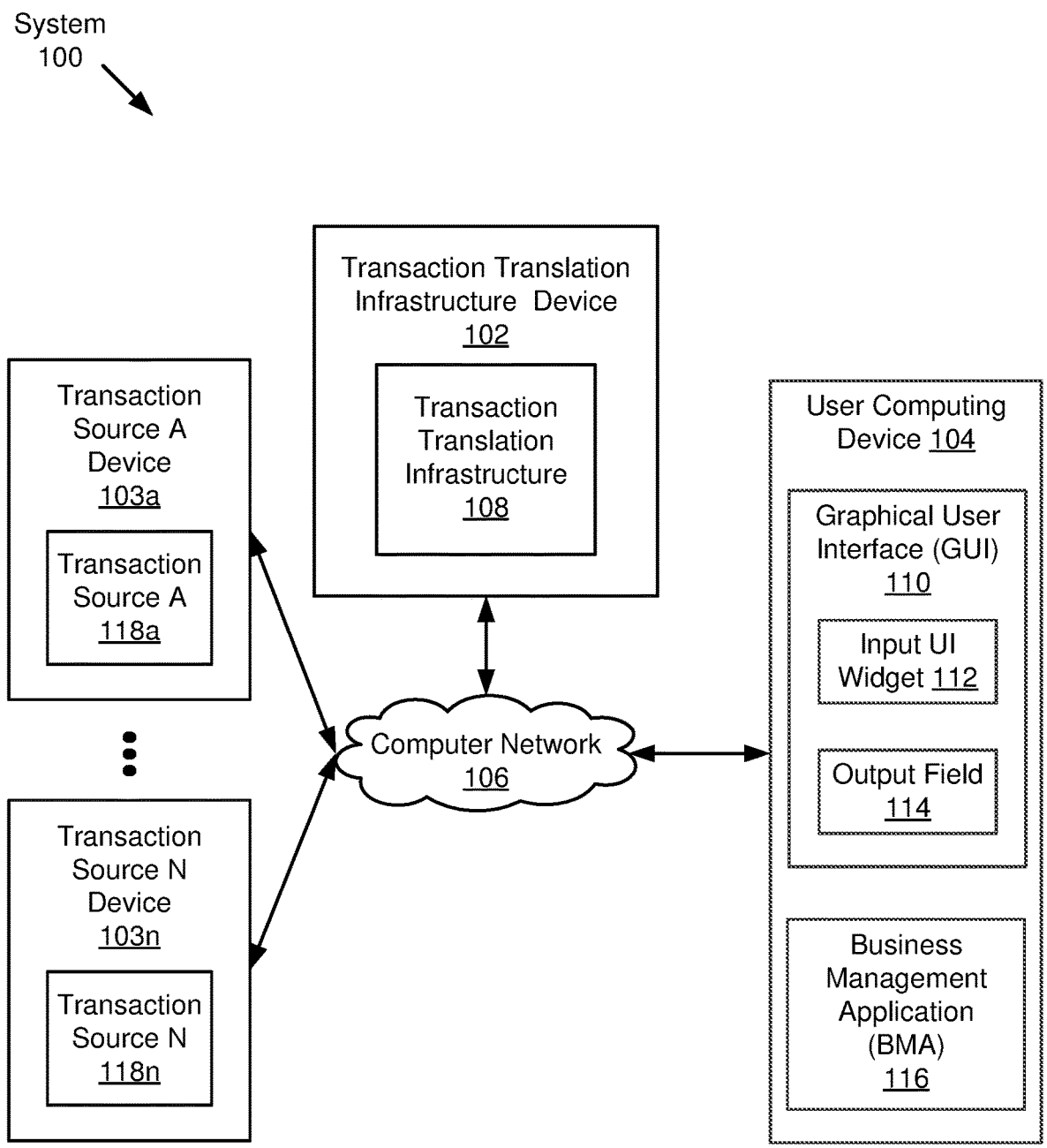
FIG. 1A, FIG. 1B, FIG. 1C, and FIG. 1D show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a system, method, and non-transitory computer readable medium for translating transaction descriptions. In one or more embodiments, a source transaction description is translated to a target entity description using a machine translation model. For example, the source transaction description may be derived from a transaction feed downloaded from a transaction source (e.g., a financial institution), and the target entity description may correspond to a vendor or customer referenced by a transaction. The accuracy of the translation may be measured using a translation accuracy metric based on the usage of the translated target entity description. In one or more embodiments, the translated target entity description is considered accurate when users accept a high proportion of actions performed on transactions that include the translated target entity description, without correcting the translated target entity description. For example, the action may be categorizing a financial transaction as a deductible expense. The translation accuracy metric may be continuously updated as users accept or reject actions performed on transactions that include the translated target entity description. In one or more embodiments, when the source transaction description matches an accurate, or golden entity description, then the target entity description is set to the matched golden entity description, without performing machine translation.

FIG. 1A shows a system (100) in accordance with one or more embodiments of the invention. As shown in FIG. 1A, the system (100) includes a transaction translation infrastructure device (102), transaction source devices (103a, 103n), a user computing device (104), and a computer network (106). The transaction translation infrastructure device (102), the transaction source devices (103a, 103n), and the user computing device (104) may correspond to the computing system (500) described with respect to FIG. 5A and the accompanying description below, or take the form of the client device (526) described with respect to FIG. 5B. In one or more embodiments, the transaction translation infrastructure device (102), the transaction source devices (103a, 103n), and the user computing device (104) may communicate via the computer network (106) (e.g., the network (520) described with respect to FIG. 5B).

In one or more embodiments, each transaction source device (103a, 103n) includes a transaction source (118a, 118n). For example, the transaction source for financial transactions may be a financial institution (e.g., a bank) or credit card processor. Alternatively, the transaction source for inventory transactions may be a factory or a warehouse. A transaction source (118a) stores information about transactions. In one or more embodiments, a transaction describes an event. For example, a transaction may describe (e.g., in a database record) raw materials, an inventory item, production or logistics operation, an invoice, sales receipt, estimate, payment, purchase order, credit card authorization, etc. The transaction source device (103a, 103n) may represent transactions in the transaction sources (118a, 118n) using a variety of different formats.

Figure 1B:
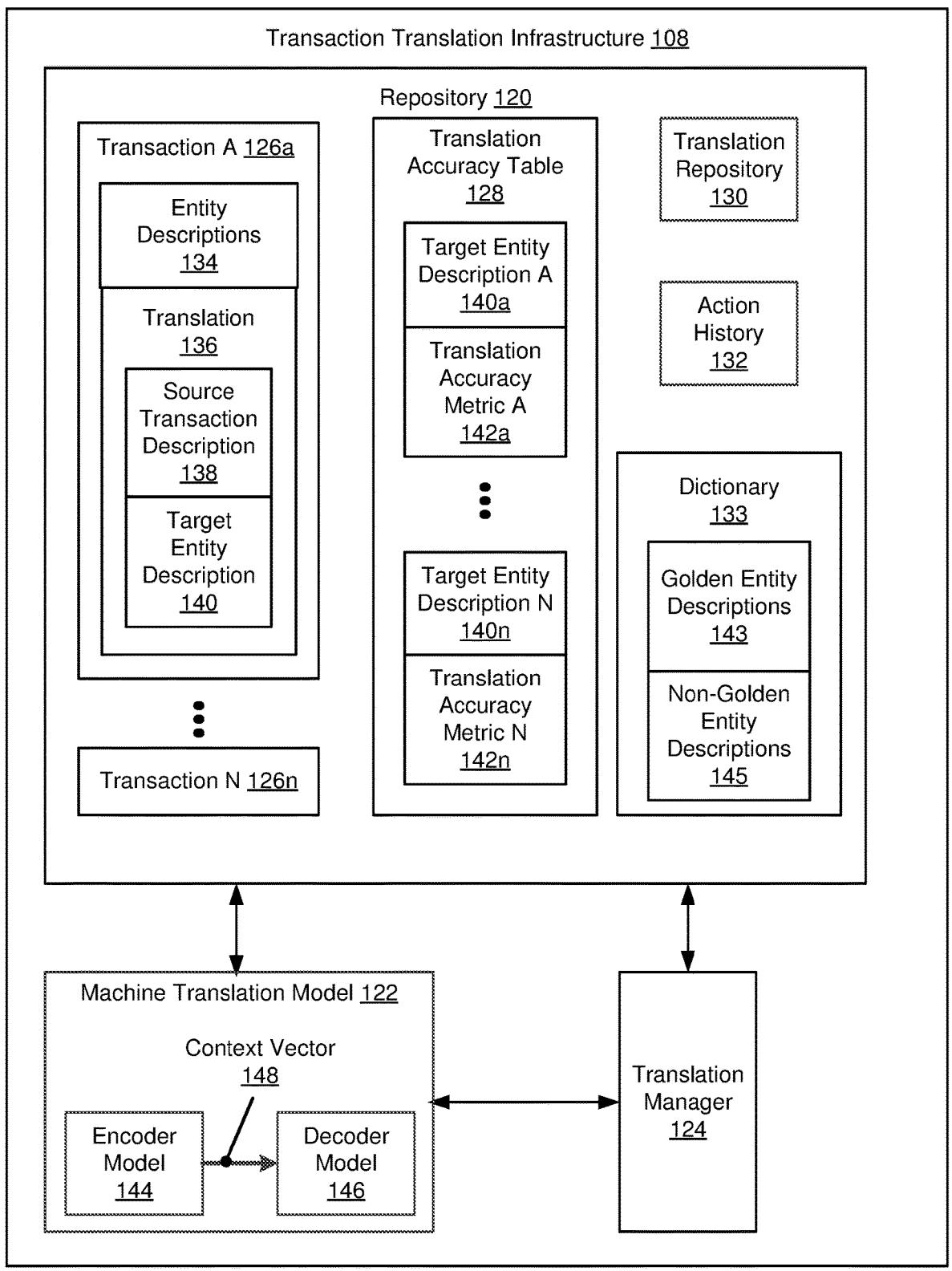

In one or more embodiments, the transaction translation infrastructure device (102) includes a transaction translation infrastructure (108). Turning to FIG. 1B, in one or more embodiments, the transaction translation infrastructure (108) includes a repository (120), a machine translation model (122), and a translation manager (124). In one or more embodiments, the repository (120) includes any type of storage unit and/or device (e.g., a file system, database, collection of tables, or any other storage mechanism) for storing data. Further, the repository (120) may include multiple different storage units and/or devices. The multiple different storage units and/or devices may or may not be of the same type or located at the same physical site.

In one or more embodiments, the repository (120) includes transactions (126a, 126n), a translation accuracy table (128), a translation repository (130), an action history (132), and a dictionary (133). Each transaction (126a) may be represented as a collection of one or more entity descriptions (134) and a translation (136). In one or more embodiments, each entity description (134) is a series of one or more tokens that represents an entity associated with the transaction (126a). In one or more embodiments, the entity may be an attribute of the transaction (126a). In one or more embodiments, an entity description (134) may correspond to an entity type. For example, entity types associated with a financial transaction may include: vendor, customer, location, date and/or time, etc. In one or more embodiments, the entity descriptions (134) may be values of fields defined by a schema for the corresponding transaction (126a).

In one or more embodiments, each translation (136) includes a source transaction description (138) and a target entity description (140). The translation (136) may indicate that the source transaction description (138) has been translated to the target entity description (140) using the machine translation model (122). In one or more embodiments, the source transaction description (138) is represented as a feature vector. For example, the feature vector may be an n-gram derived from the entity descriptions (134) of a transaction (126a). In one or more embodiments, the target entity description (140) corresponds to one of the entity descriptions (134) included in the transaction (126a). In one or more embodiments, the target entity description (140) is represented as a feature vector.

In one or more embodiments, the source transaction description (138) is derived from a raw transaction description obtained (e.g., downloaded) from a transaction source. The raw transaction description may be represented in a variety of different formats, depending on the transaction sources that contributed to the raw transaction description. For example, if the raw transaction description describes a financial transaction, then different transaction sources (e.g., a bank and a credit card processor) may contribute different portions of the raw transaction description. Examples of raw transaction descriptions (e.g., downloaded from a financial institution) are listed below:

"SAFEWAY STORE 000314 SAN FRANCISCO CA USD @ 24.97"

"SAFEWAY STORE 000122 Reference Number: 12777 Merchant Name: SAFEWAY STORE 000122 Merchant Information: SAN FRANCISCO CA Category: Retail/Department Stores"

"SAFEWAY STORE 0002537 POS PURCHASE MERCHANT TERMINAL 006233 10-02-18 XXXXX0000".

The raw transaction descriptions listed above may correspond to the same target entity description, in this case, an entity description "SAFEWAY" corresponding to the entity type "vendor".

Figure 1C:
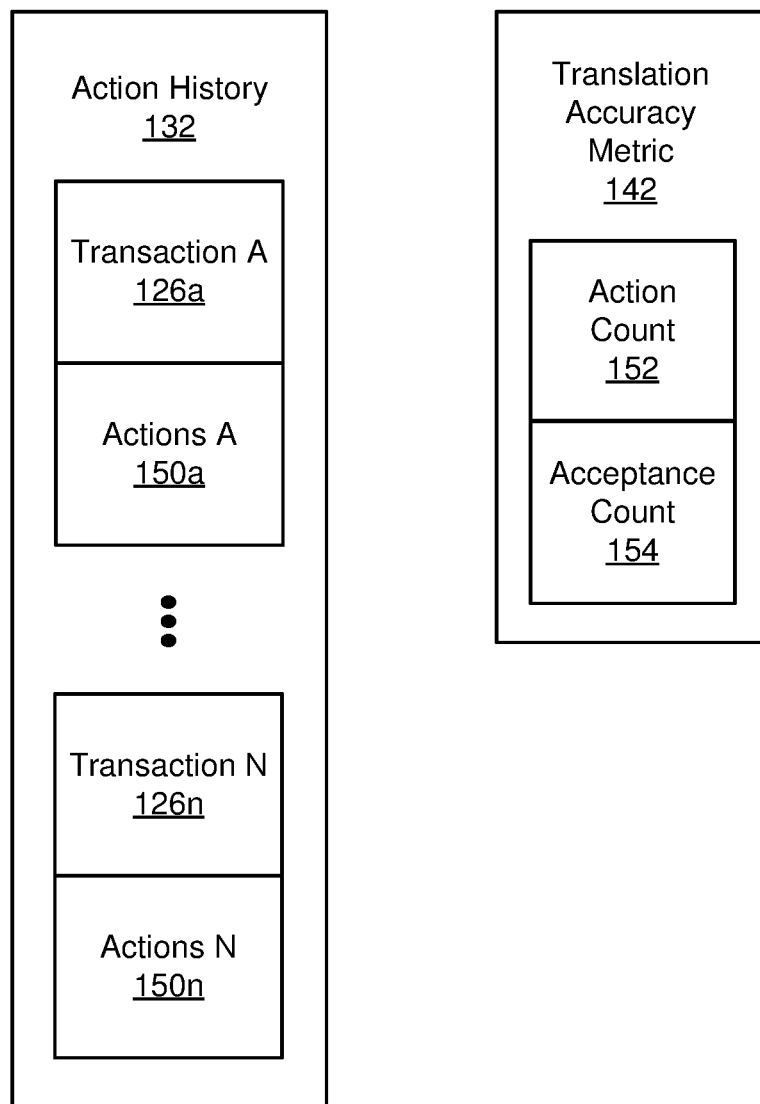

In one or more embodiments, the translation accuracy table (128) includes translation accuracy metrics (142a, 142n) corresponding to target entity descriptions (140a, 140n). Each translation accuracy metric (142a) may measure the usage of the corresponding target entity description (140a). Turning to FIG. 1C, in one or more embodiments, a translation accuracy metric (142) is based on an action count (152) and an acceptance count (154). The action count (152) and the acceptance count (154) may be based on the action history (132). In one or more embodiments, the action history (132) includes one or more actions (150a) performed on each transaction (126a). For example, an action may assign a category (e.g., deductible expense) to a financial transaction, or may assign the financial transaction to an account (e.g., in a chart of accounts). Alternatively, an action may assign a status (e.g., to be shipped to the customer) to an inventory transaction.

The action count (152) may indicate the number of actions performed on a transaction (126a) that include the target entity description corresponding to the translation accuracy metric (142). Each of the actions (150a) performed on a transaction (126a) may be accepted or rejected by a user. For example, the user may accept or reject a categorization of a transaction. One example of a rejection occurs when the user corrects the target entity description in the transaction. That is, the intent of the translation accuracy metric (142) is to measure translation accuracy, and the user correction may indicate that the corresponding target entity description is inaccurate. In one or more embodiments, each of the actions (150a) includes an action status flag that indicates whether the corresponding action was accepted by the user.

The acceptance count (154) may indicate a number of actions performed on a transaction (126a) that include the target entity description corresponding to the translation accuracy metric (142) that have been accepted by a user. In other words, the acceptance count (154) may indicate how many of the actions corresponding to the action count (152) have been accepted by a user.

In one or more embodiments, the value of the translation accuracy metric (142) may combine the action count (152) and the acceptance count (154). For example, the value of the translation accuracy metric (142) may be a logarithm of the action count (152) added to the acceptance count (154).

In one or more embodiments, each of the actions (150a) includes a timestamp. For example, the timestamp may indicate when the corresponding action was performed, accepted, or rejected. In one or more embodiments, the translation accuracy metric (142) may weight recent actions (e.g., actions whose timestamp is within the past month) more heavily than older actions (e.g., actions whose timestamp is within the past year). For example, overweighting recent actions may help keep the translation accuracy metric current with respect to the most recent usage of the target entity description corresponding to the translation accuracy metric (142). In one or more embodiments, the translation accuracy metric (142) is specific to the entity type (e.g., "vendor") corresponding to the target entity description.

Figure 1D:
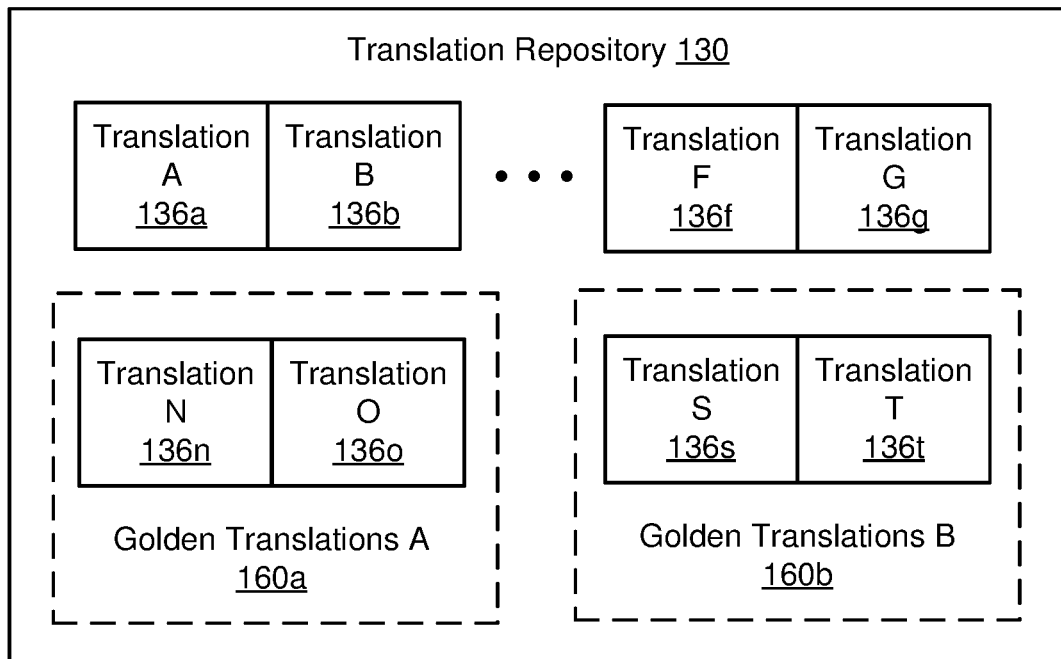
Figure 1D:
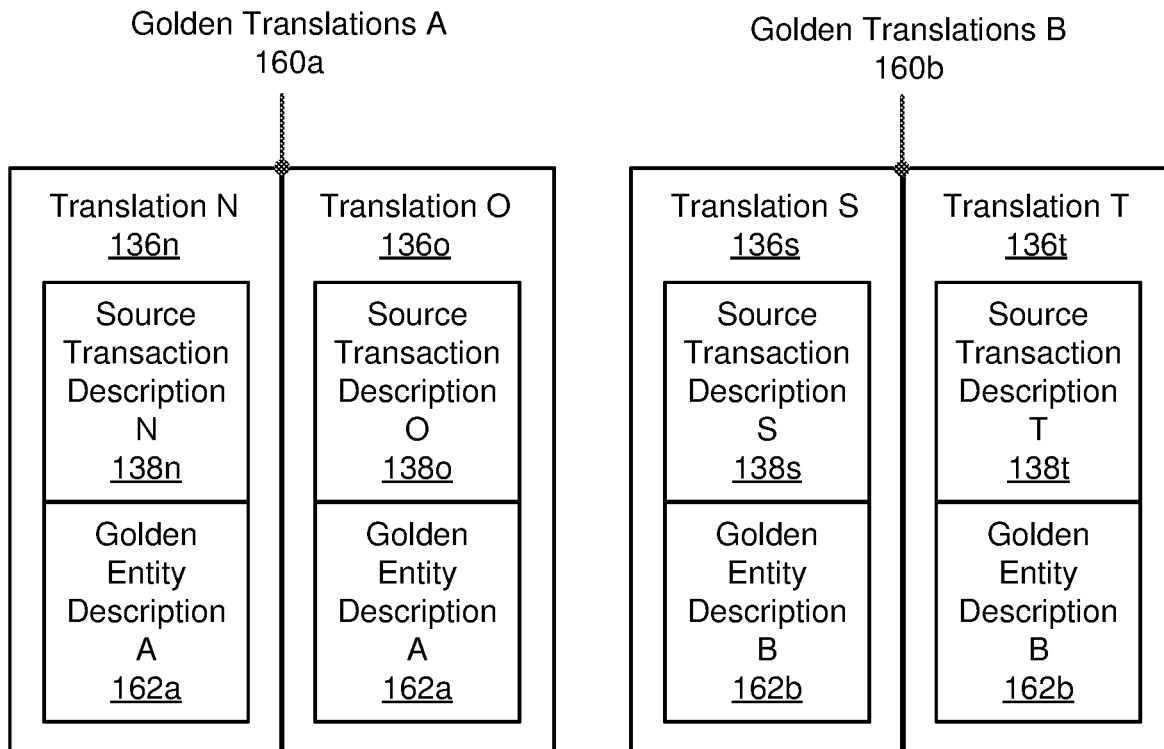

Turning to FIG. 1D, in one or more embodiments, the translation repository (130) includes translations (e.g., 136a, 136b, 136f, 136g, 136n, 136o, 136s, 136t). In one or more embodiments, golden translations (160a, 160b) are subsets of the translations (136a, 136t) that include a target entity description that is considered to be accurate (e.g., based on a translation accuracy metric for the target entity description). In one or more embodiments, each translation in a set of golden translations (160a, 160b) includes the same target entity description, referred to as a golden (e.g., accurate) entity description (162a, 162b). In one or more embodiments, the translation accuracy metrics corresponding to the golden entity descriptions (162a, 162b) satisfy a translation accuracy criterion. Examples of golden entity descriptions corresponding to the entity type "vendor" may include "Walmart", "Home Depot", etc.

Continuing with FIG. 1D, golden translations A (160a) includes translations (136n, 136o) that include different source transaction descriptions (138n, 138o) that are each translated to golden entity description A (162a). Similarly, golden translations B (160b) includes translations (136s, 136t) that include different source transaction descriptions (138s, 138t) that are each translated to golden entity description B (162b). In one or more embodiments, golden translations (e.g., 160a, 160b) may be used to train the machine translation model (122).

Returning to FIG. 1C, in one or more embodiments, the translation accuracy criterion is based on the action count (152) and the acceptance count (154) of the translation accuracy metric (142). For example, the translation accuracy criterion may specify that the action count exceed an action count threshold, to guarantee that a sufficient volume of actions have been performed on transactions that include the target entity description. In addition, the translation accuracy criterion may specify that a ratio of the acceptance count to the action count exceeds an acceptance ratio threshold. As another example, the translation accuracy criterion may specify that a logarithm of the action count plus the acceptance count exceeds a threshold.

Returning to FIG. 1B, in one or more embodiments, the dictionary (133) includes commonly used entity descriptions that appear in transactions (126a, 126n). In one or more embodiments, the dictionary (133) includes golden entity descriptions (143) and non-golden entity descriptions (145). Each of the golden entity descriptions (143) may correspond to a translation accuracy metric (142a) that satisfies a translation accuracy criterion. Each of the non-golden entity descriptions (145) may correspond to a translation accuracy metric (142a) that does not satisfies a translation accuracy criterion.

In one or more embodiments, the machine translation model (122) includes functionality to translate source transaction descriptions (138) into target entity descriptions (140). During a training phase, the machine translation model (122) is trained to produce output based on a set of input. In one or more embodiments, the input is a source transaction description (138) and the output is a target entity description (140). For example, both the source transaction description (138) and the target entity description (140) may be represented as feature vectors.

In one or more embodiments, in a prediction phase, the machine translation model (122) generates an output (e.g., a target entity description (140)) when provided with input (e.g., a source transaction description (138)). The set of input used during the training phase may not match the input provided during the prediction phase.

Without a machine translation approach, it may be difficult to automatically (e.g., without user correction) translate a source transaction description (138) to a target entity description (140).

In one or more embodiments, the machine translation model (122) includes two distinct machine learning models to translate a single source transaction description (138). In one or more embodiments, once trained, the two machine learning models operate independently. The encoder model (144) may be configured to generate a context vector (148) from a source transaction description (138). In other words, the encoder model (144) may be configured to encode the source transaction description (138) and create a context vector (148). In one or more embodiments, the decoder model (146) is configured to decode the context vector (148) into a target entity description (140).

Alternatively, in one or more embodiments, the decoder model (146) is configured to decode the context vector (148) into one or more tokens that are known to be irrelevant to identifying a target entity description (140).

The encoder model (144) and the decoder model (146) are deep learning machine learning models. Deep learning, also known as deep structured learning or hierarchical learning, is part of a broader family of machine learning methods based on learning data representations, as opposed to task-specific algorithms. The encoder model (144) and the decoder model (146) may each be recurrent neural networks (RNN). In other words, the system may have at least two RNN, one for each of the encoder model (144) and one for the decoder model (146). An RNN is a network that operates on a sequence and uses its own output as input for subsequent steps. The RNN may be a single or multilayer RNN. Further, the RNN may be a long short term memory (LSTM) RNN. The expression long short-term refers to the fact that LSTM is a model for the short-term memory which can last for a long period of time. An LSTM is well-suited to classify, process and predict time series given time lags of unknown size and duration between events. LSTM units are the building blocks of the layers of the RNN in one or more embodiments. Further, the encoder machine learning model and the decoder machine learning model may form a sequence to sequence (seq2seq) network. In one or more embodiments, the encoder-decoder model may also be other deep learning models such as Convolution Neural Network (CNN) and Fully Connected Network (FC), or other machine learning models.

The encoder model (144) may include a character to indices mapping. The character to indices mapping may be referred to as an encoder dictionary. The character to indices mapping maps individual characters of the input to an index value. A set of words are selected based on frequency of use in the transaction translation infrastructure (108). Each character in the set of words has a unique location in a vector space. The characters to indices mapping defines the location of the characters in the vector space. When mapping an input, each character is a one-hot vector, or giant vector of zeros except for a single one at the index of the word. Thus, for example, the character to indices mapping may map the character "o" in the word "network" to 05, which is represented by the vector [0 0 0 0 0 1 0 0 0 . . . ].

Similarly, the decoder model (146) may include an indices to character mapping. The indices to character mapping has the same characteristics as described with respect to the character to indices mapping. The indices to character mapping maps index values to characters. The indices to character mapping may be referred to as a decoder dictionary. The encoder dictionary and the decoder dictionary may be the same or different. For example, the encoder dictionary may represent the same set of characters as the decoder dictionary or a different set of characters. By way of another example, the same character in the encoder dictionary and the decoder dictionary may be mapped to different index values in the different dictionaries. Returning to the "network" example above, the index to character mapping of the decoder dictionary may map the "0" in the word "network" to 23, which is represented by the vector of zeros with a one in the twenty-third position.

Continuing with the encoder model (144), the encoder model creates a context vector (148). The context vector (148) is a hidden state of the encoder model (144) and encodes the meaning behind the source transaction description (138). In one or more embodiments, the context vector (148) has fixed dimensionality. That is, the size of the context vector (148) may be independent of the length of the source transaction description (138). In one or more embodiments, the context vector (148) is a numeric sequence.

In one or more embodiments, the translation manager (124) is software, hardware, or any combination thereof that includes functionality to download and/or preprocess a raw transaction description. Examples of such preprocessing may include: setting digit sequences (e.g., transaction numbers or identifiers, phone numbers, reference numbers, etc.) present in the raw transaction description to zeroes, converting all characters present in the raw transaction description to uppercase, etc. In one or more embodiments, the translation manager (124) includes functionality to generate a transaction (126a) that represents the raw transaction description. The translation manager (124) may include functionality to detect an acceptance of an action performed on a transaction (126a). The translation manager (124) may include functionality to set and/or update a translation accuracy metric (142a) for a target entity description (140a). The translation manager (124) may include functionality to determine that the translation accuracy metric (142a) satisfies a translation accuracy criterion. The translation manager (124) may include functionality to add a target entity description (140a) to, or remove a target entity description (140a) from, the golden entity descriptions (143). The translation manager (124) may include functionality to generate training data for the machine translation model (122).

Returning to FIG. 1A, the user computing device (104) provides, to a user, various computing functionality. For example, the computing functionality may include word processing, multimedia processing, financial management, social network connectivity, network management, and/or various other functions that a computing device performs for a user. In one or more embodiments, the user computing device (104) includes a graphical user interface (GUI) (110) and a business management application (BMA) (116).

In one or more embodiments, the GUI (110) is an interface for connecting to the transaction translation infrastructure device (102). In one or more embodiments, the GUI (110) is an interface for receiving input from a user and transmitting output to the user. For example, the GUI (110) may be generated by a remote web application and transmitted to a user's web browser. By way of another example, the GUI (110) may be an interface of a software application providing functionality to the user. In such a scenario, the help menu, popup window, frame, or other portion of the GUI (110) may connect to the user computing device (104) and present output. In one or more embodiments, the GUI (110) includes an input user interface (UI) widget (112) and an output field (114). The input UI widget (112) is a user interface component that includes functionality to receive input from a user, such as an acceptance or rejection of an action performed on a transaction. For example, the input UI widget (112) may be a text box or a check box. The output field (114) includes functionality to present results to the user. For example, the output field may include functionality to present an action performed on a transaction.

In one or more embodiments, the GUI (110) may be an interface of the BMA (116). For example, the BMA (116) may be a financial management application (FMA), an inventory management application, production control application, etc.

While FIG. 1A, FIG. 1B, FIG. 1C, and FIG. 1D show configurations of components, other configurations may be used without departing from the scope of the invention. For example, various components may be combined to create a single component. As another example, the functionality performed by a single component may be performed by two or more components.

Figure 2:
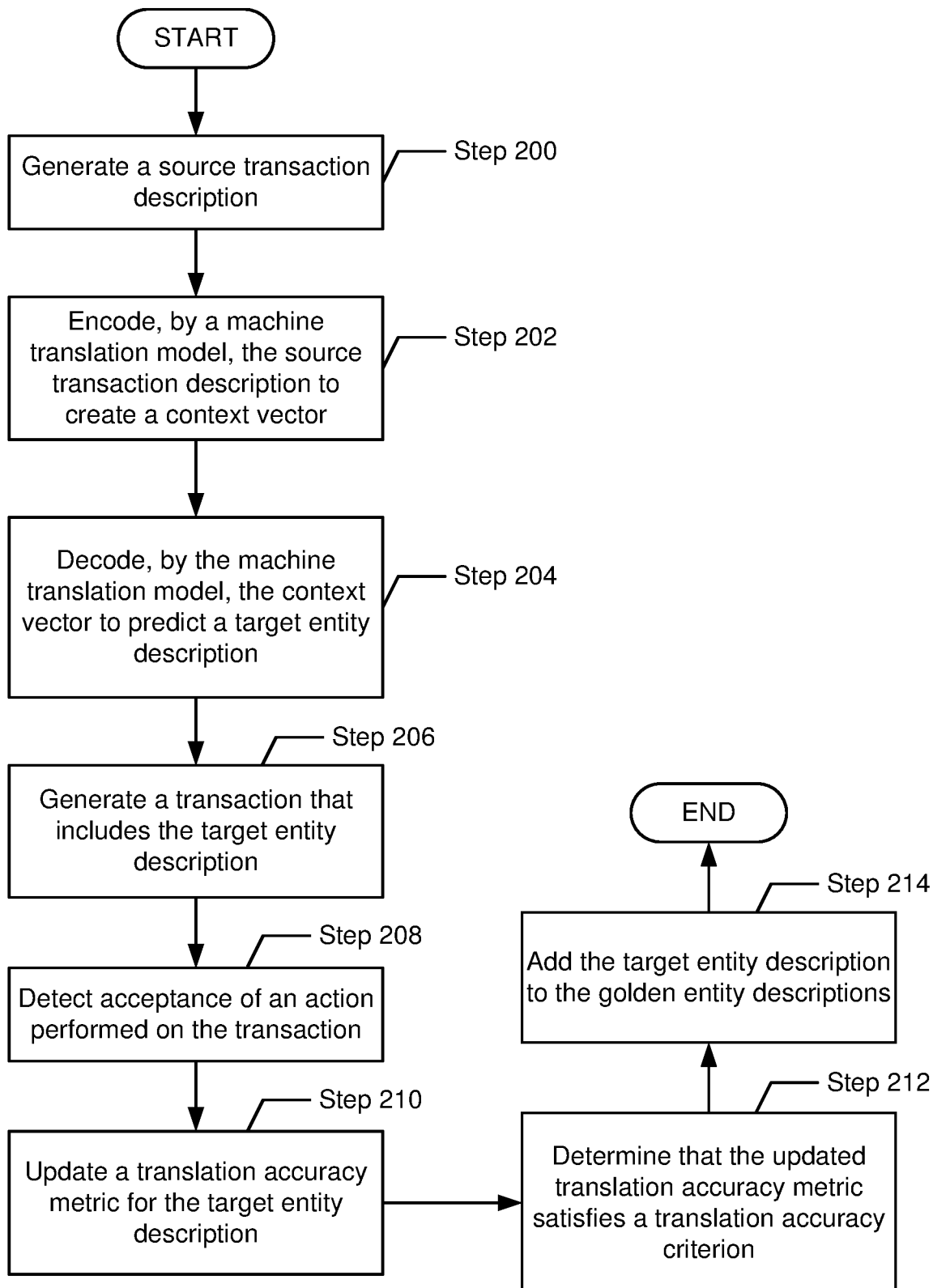
FIG. 2, FIG. 3A, and FIG. 3B show flowcharts in accordance with one or more embodiments of the invention.

FIG. 2 shows a flowchart in accordance with one or more embodiments of the invention. The flowchart depicts a process for translating transaction descriptions. One or more of the steps in FIG. 2 may be performed by the components (e.g., the machine translation model (122) and the translation manager (124) of the transaction translation infrastructure (108), or the graphical user interface (GUI) (110) or business management application (BMA) (116) of the user computing device (104)) discussed above in reference to FIG. 1A and FIG. 1B. In one or more embodiments, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 200, a source transaction description is generated. In one or more embodiments, the source transaction description may be generated from a raw transaction description obtained from a transaction source, such as a financial institution or credit card processor. The source transaction description may be represented as a feature vector derived from the raw transaction description. The raw transaction description may be transmitted, via the network, using various communication protocols to the transaction translation infrastructure device. The raw transaction description may be formed by combining various information obtained from the transaction source. For example, the raw transaction description may be formed by concatenating a downloaded transaction description with a downloaded "transaction memo" field.

In one or more embodiments, to simplify and speed up subsequent machine translation, the translation manager may preprocess the raw transaction description. For example, digit sequences present in the raw transaction description may be set to zeroes, and characters present in the raw transaction description may be converted to uppercase, etc.

In Step 202, the source transaction description is encoded to create a context vector. In one or more embodiments, the encoder model encodes the source transaction description at a character level to create the context vector. Specifically, machine learning is applied to the source transaction description to transform the source transaction description into a context vector. The encoder dictionary is applied to the source transaction description to obtain the indices for the characters of the source transaction description. The indices are used to create vectors for the characters. Through several layers of the encoder model, the encoder creates output and a hidden state. The last hidden state is the context vector. The last output may be ignored, thus, the encoder model receives, as input, a variable-length input sequence (e.g., the source transaction description), and outputs a fixed-length context vector. The context vector may be a feature vector representing the input sequence. Thus, the encoder model is responsible for stepping through the input time steps and encoding the entire sequence into a fixed length vector called a context vector.

In Step 204, the context vector is decoded to predict a target entity description. In one or more embodiments, the decoder model decodes the context vector at a character level into the target entity description. The decoder model has a similar structure as the encoder model but in opposite orientation. The decoder model takes the context vector as the first hidden state and creates a variable-length sequence. At the end of processing, the variable length sequence is a set of vectors having a one at a particular location. The decoder dictionary is applied to the set of vectors to obtain characters but are different from the source transaction description. The characters decoded by the decoder model may represent the target entity description. Thus, the decoder model is responsible for stepping through the output time steps while reading from the context vector.

Alternatively, in one or more embodiments, the decoder model decodes the context vector into one or more tokens that are known to be irrelevant to identifying a target entity description. Then, the translation manager may predict the target entity description by removing the irrelevant tokens from the source transaction description.

Once the target entity description has been predicted, in one or more embodiments, the translation manager stores, in the translation repository, a translation that includes: 1) the source transaction description, and 2) the target transaction description.

In Step 206, a transaction including the target entity description is generated. In one or more embodiments, the transaction is stored in a repository. The repository may be accessible by a business management application (BMA) executing on the user computing device. For example, a financial transaction may be accessible by a financial management application (FMA).

In one or more embodiments, the target entity description corresponds to a specific entity type (e.g., vendor, customer, location, date and/or time, etc.). The transaction may include additional entity descriptions corresponding to other entity types. The additional entity descriptions in the transaction may be created by various means. In one or more embodiments, additional machine translation models may be used to translate the source transaction description to additional entity descriptions corresponding to other entity types. Alternatively, in one or more embodiments, the translation manager may generate additional entity descriptions from the source transaction description using regular expressions. For example, regular expressions may be used to parse entities (e.g., a date or time, a location, etc.) corresponding to an entity type associated with commonly used grammars or formats.

In Step 208, an acceptance, by a user, of an action performed on the transaction is detected. In one or more embodiments, the translation manager may detect the acceptance by querying an action history that includes one or more actions corresponding to the transaction. For example, the query may request actions corresponding to the transaction that have been accepted by the user. The action history may be updated by a business management application (BMA) executing on the user computing device. For example, the BMA may update the action history by setting an action status flag corresponding to the action indicating whether the user has accepted or rejected the action.

In one or more embodiments, the translation manager may detect the acceptance of the action by tracking user interactions with a graphical user interface (GUI). For example, the GUI may interface with a BMA that performs the action on the transaction in response to user input.

In Step 210, a translation accuracy metric for the target entity description is updated in response to detecting the acceptance of the action. For example, both the action count and the acceptance count of the translation accuracy metric may be incremented in response to detecting the acceptance of the action.

In Step 212, it is determined that the updated translation accuracy metric satisfies a translation accuracy criterion. For example, translation manager may determine that the ratio of the acceptance count of the updated translation accuracy metric to the action count of the updated translation accuracy metric exceeds an acceptance ratio threshold of the translation accuracy criterion.

In one or more embodiments, the translation manager may dynamically adapt the translation accuracy criterion based on the current number of golden entity descriptions. For example, a threshold (e.g., an action count threshold or an acceptance ratio threshold) of the translation accuracy criterion may be increased when the current number of golden entity descriptions exceeds a threshold number of golden entities. Alternatively, the threshold may be decreased when the current number of golden entity descriptions falls below the threshold number of golden entities. Dynamically adapting the translation accuracy criterion based on the current number of golden entity descriptions may help maintain the number of golden entities within a desired range.

In Step 214, the target entity description is added to the golden entity descriptions in response to determining that the updated translation accuracy metric satisfies the translation accuracy criterion. In other words, a non-golden entity description may become a golden entity description when the updated translation accuracy metric satisfies the translation accuracy criterion. For example, the translation manager may add the target entity description to a list of golden entity descriptions, or may set a "golden" flag in a representation of the target entity description.

Figure 3A:
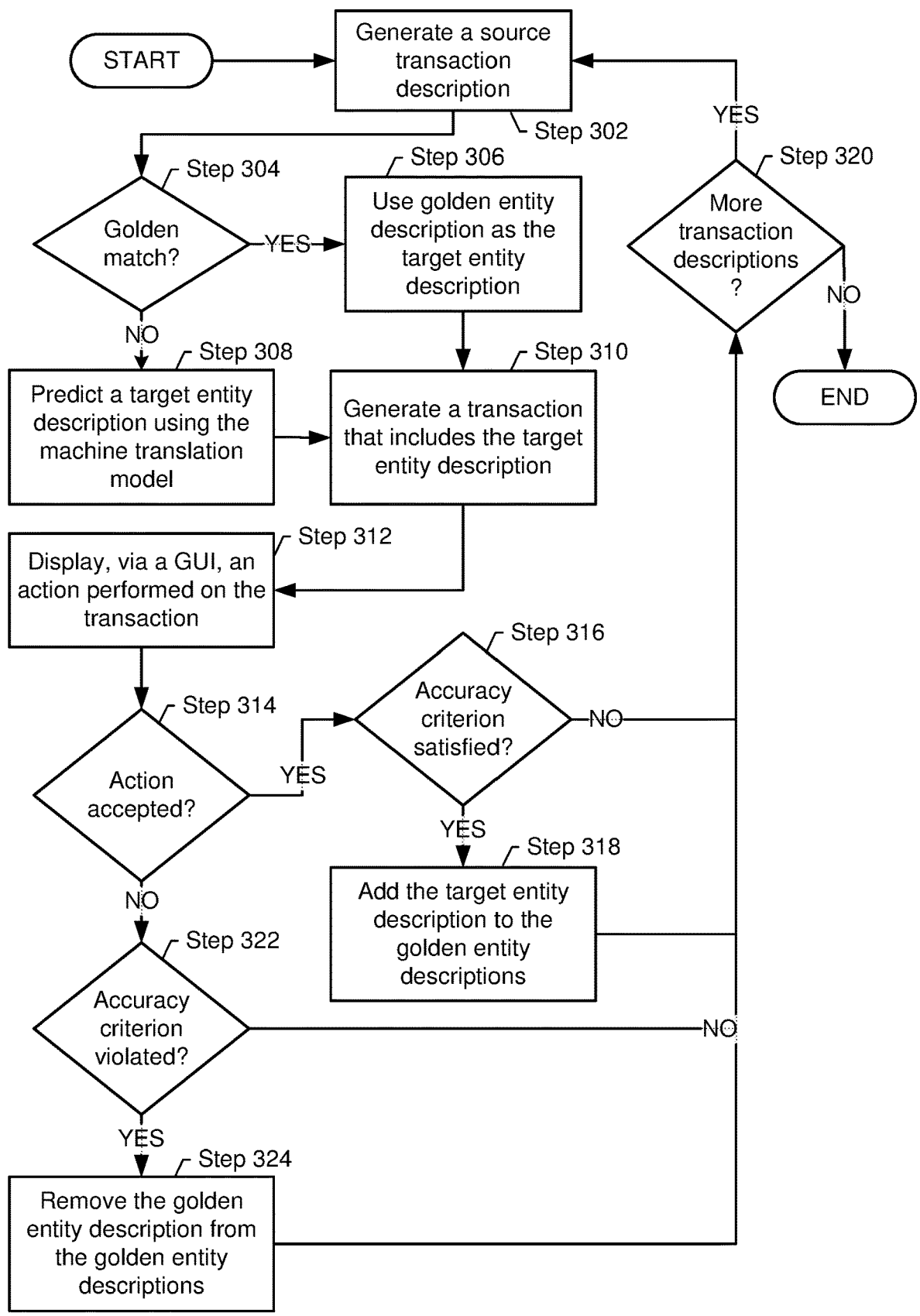

FIG. 3A shows a flowchart in accordance with one or more embodiments of the invention. The flowchart depicts a process for translating transaction descriptions. One or more of the steps in FIG. 3A may be performed by the components (e.g., the machine translation model (122) and the translation manager (124) of the transaction translation infrastructure (108), or the graphical user interface (GUI) (110) or business management application (BMA) (116) of the user computing device (104)) discussed above in reference to FIG. 1A and FIG. 1B. In one or more embodiments, one or more of the steps shown in FIG. 3A may be omitted, repeated, and/or performed in parallel, or in a different order than the order shown in FIG. 3A. Accordingly, the scope of the invention should not be considered limited to the specific arrangement of steps shown in FIG. 3A.

Initially, in Step 302, a source transaction description is generated (see description of Step 200 above).

If, in Step 304, a determination is made that the source transaction description matches a golden entity description, then, in Step 306, the golden entity description is used as the target entity description. In one or more embodiments, the source transaction description matches the golden entity description when a feature vector corresponding to the source transaction description matches a feature vector corresponding to the golden entity description.

Otherwise, if Step 304 determines that the source transaction description does not match any golden entity description, then, in Step 308, the target entity description is predicted using the machine translation model (see description of Step 202 and Step 204 above).

In Step 310, a transaction including the target entity description is generated (see description of Step 206 above).

In Step 312, an action performed on the transaction is displayed to a user via a graphical user interface (GUI). For example, the GUI may be an interface of a business management application (BMA) executing on the user computing device that performs the action.

If, in Step 314, an acceptance, by a user, of an action performed on the transaction is detected (see description of Step 208 above), then a translation accuracy metric for the target entity description is updated (see description of Step 210 above), and Step 316 below is executed. Otherwise, if Step 314 does not detect the acceptance, then the translation accuracy metric for the target entity description is updated, and Step 322 below is executed.

If, in Step 316, a determination is made that the updated translation accuracy metric for the target entity description satisfies a translation accuracy criterion (see description of Step 212 above), and the target entity description is a non-golden entity description, then Step 318 below is executed. That is, in one or more embodiments, the translation manager updates the translation accuracy metric corresponding to the target entity description to determine whether a non-golden entity description should now become a golden entity description. Otherwise, if Step 316 determines that the updated translation accuracy metric for the target entity description does not satisfy the translation accuracy criterion, then Step 320 below is executed.

In Step 318, the target entity description is added to the golden entity descriptions. That is, the target entity description may be considered to be an accurate translation once the translation accuracy metric corresponding to the target entity description satisfies the translation accuracy criterion.

In one or more embodiments, the translation manager may retrain the machine translation model using golden translations corresponding to the target entity description (see description of Step 358 and Step 360 of FIG. 3B below).

If, in Step 320, a determination is made that there are additional transaction descriptions (e.g., raw transaction descriptions) to be processed, then the process for translating transaction descriptions in FIG. 3A is repeated for each additional transaction description, beginning with Step 302 above.

If, in Step 322, a determination is made that the updated translation accuracy metric for the target entity description violates a translation accuracy criterion, and the target entity description is a golden entity description, then Step 324 below is executed. That is, in one or more embodiments, the translation manager updates the translation accuracy metric corresponding to the target entity descriptions to determine whether a golden entity description should now become a non-golden entity description. Otherwise, if Step 322 determines that the updated translation accuracy metric for the target entity description does not violate the translation accuracy criterion, then Step 320 above is executed.

In Step 324, the golden entity description is removed from the golden entity descriptions. That is, the now-former golden entity description may no longer be considered to be an accurate translation once the translation accuracy metric corresponding to the golden entity description violates the translation accuracy criterion. Then, Step 320 above is executed.

Figure 3B:
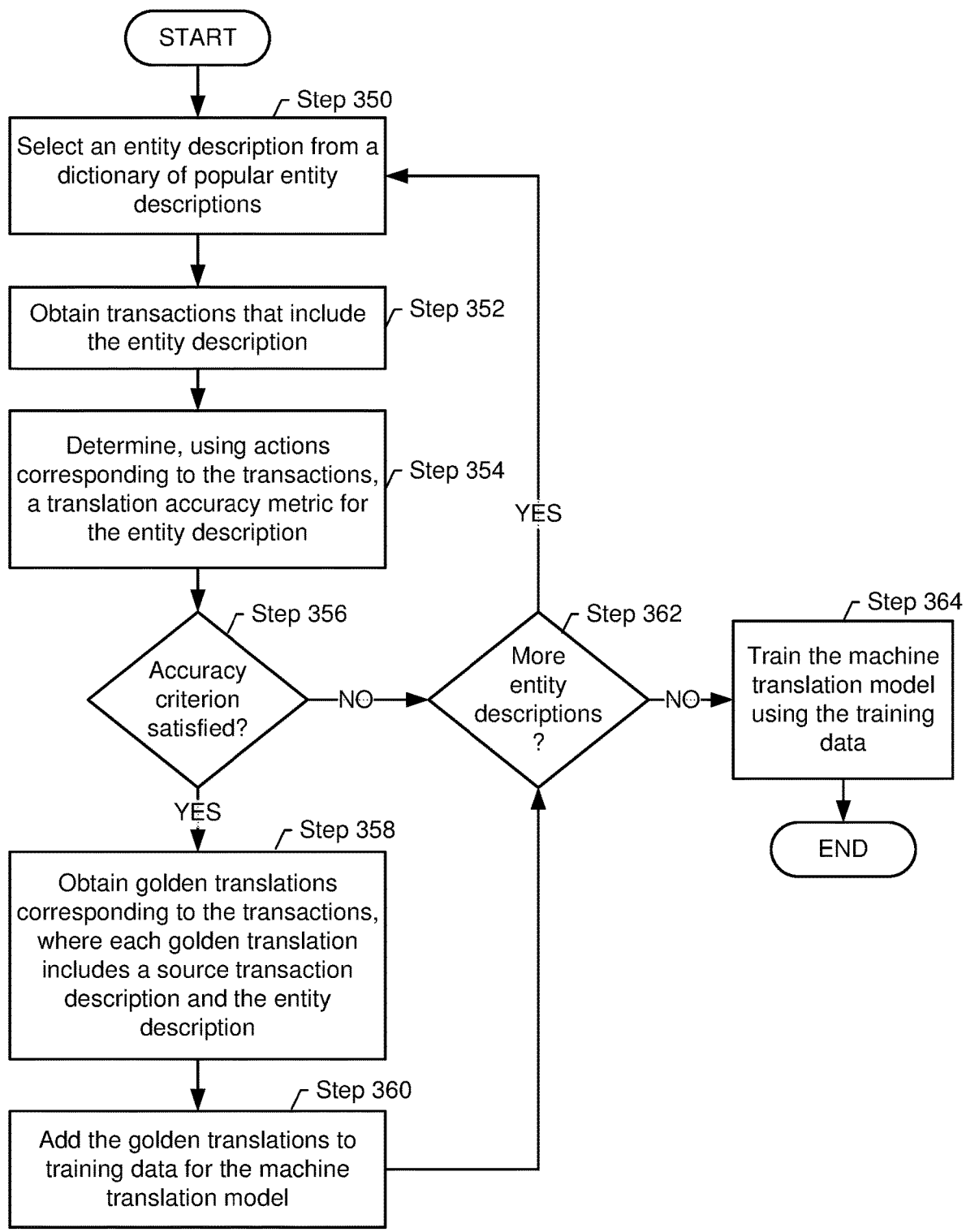

FIG. 3B shows a flowchart in accordance with one or more embodiments of the invention. The flowchart depicts a process for training the machine translation model. One or more of the steps in FIG. 3B may be performed by the components (e.g., the machine translation model (122) and the translation manager (124) of the transaction translation infrastructure (108), or the graphical user interface (GUI) (110) or business management application (BMA) (116) of the user computing device (104)) discussed above in reference to FIG. 1A and FIG. 1B. In one or more embodiments, one or more of the steps shown in FIG. 3B may be omitted, repeated, and/or performed in parallel, or in a different order than the order shown in FIG. 3B. Accordingly, the scope of the invention should not be considered limited to the specific arrangement of steps shown in FIG. 3B.

Initially, in Step 350, an entity description from a dictionary of popular entity descriptions is selected as a possible candidate for training the machine translation model.

In one or more embodiments, the selected entity description is represented as a feature vector.

The encoder dictionary and decoder dictionary may be based on the dictionary of popular entity descriptions. Specifically, character frequency within the dictionary of popular entity descriptions may be used to select the set of characters to represent in the encoder dictionary and the decoder dictionary. For the decoder dictionary, proper language may be selected. The index values in the words may be randomly defined. In particular, the index value assigned to a selected character is irrelevant as long as a one-to-one mapping exists in one or more embodiments. Remaining unselected characters (i.e., characters that are not selected) may be associated with a predefined value in the index for unknown characters.

In Step 352, transactions that include the selected entity description are obtained. In one or more embodiments, the transactions are obtained by querying a repository for transactions that include the selected entity description. For example, the repository may include transactions generated by a business management application (BMA) executing on the user computing device.

In Step 354, a translation accuracy metric is determined for the selected entity description using actions corresponding to the transactions. In one or more embodiments, the actions are obtained by querying an action history for actions corresponding to each transaction that includes the selected entity description. Each of the actions may indicate (e.g., via an action status flag) whether the action has been accepted by a user. In one or more embodiments, the translation accuracy metric is based on the results of querying the action history. For example, the translation accuracy metric may be based on an action count derived from the number of actions corresponding to the transactions that include the selected entity description. Continuing this example, the translation accuracy metric may further be based on an acceptance count derived from the number of actions accepted by a user corresponding to the transactions that include the selected entity description.

If, in Step 356, a determination is made that the translation accuracy metric for the selected entity description satisfies a translation accuracy criterion (see description of Step 212 above), then Step 358 below is executed. Otherwise, if Step 356 determines that the translation accuracy metric for the selected entity description does not satisfy the translation accuracy criterion, then Step 362 below is executed.

In Step 358, golden translations corresponding to the transactions that include the selected entity description are obtained. Each golden translation may include a source transaction description and the selected entity description. In one or more embodiments, the translation manager obtains the golden translations by querying a translation repository for translations that include the selected entity description.

In Step 360, the golden translations are added to training data for the machine translation model. In one or more embodiments, the training data for the machine translation model may be limited to golden translations. Thus, training the machine translation model using golden translations, which are considered to be accurate translations, may improve the accuracy of the machine translation model.

If, in Step 362, a determination is made that there are additional entity descriptions to be processed, then the process for generating training data for a machine translation model in FIG. 3B is repeated for each additional entity description, beginning with Step 350 above.

Otherwise, if Step 362 determines that there are no additional entity descriptions to be processed, then in Step 364, the machine translation model is trained using the training data. Specifically, the encoder model may be trained to generate a context vector from the source transaction description of each translation in the training data. The context vector encodes the meaning of the source transaction description. The decoder model is trained to predict the target entity description from the context vector. Specifically, the source transaction description is processed through the encoder model, while every output and the latest hidden state is tracked. When the encoder model finishes processing the source transaction description, the latest hidden state is the context vector. The decoder model is given a "start of sentence" token as the decoder model's first input, and the context vector as the decoder model's first hidden state. The decoder model is then trained to generate, from the context vector, the target entity description. The training process is repeated for each source transaction description and target entity description of each translation in the training data.

Figure 4A:
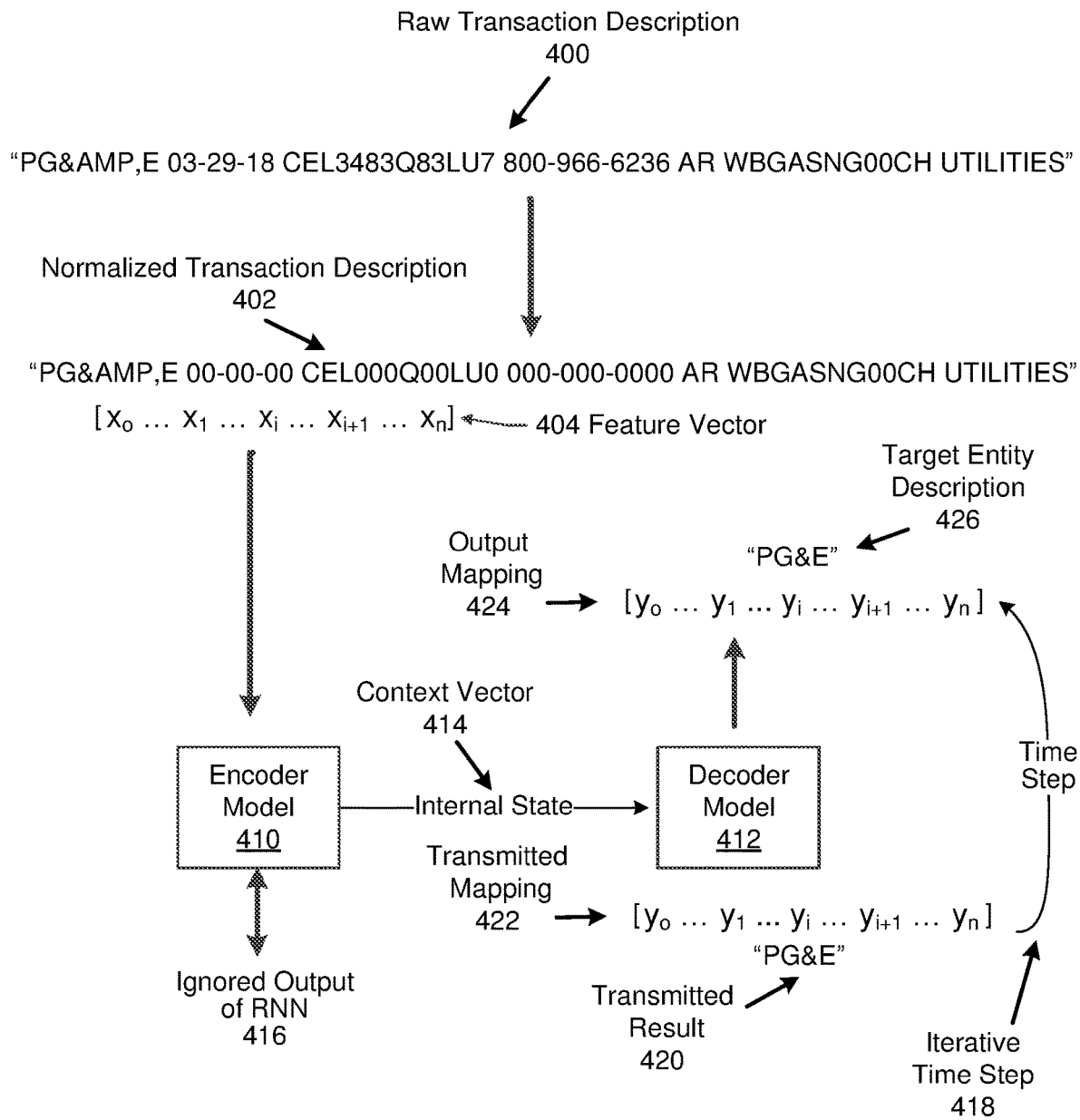
FIG. 4A, FIG. 4B, and FIG. 4C show examples in accordance with one or more embodiments of the invention.
Figure 4B:
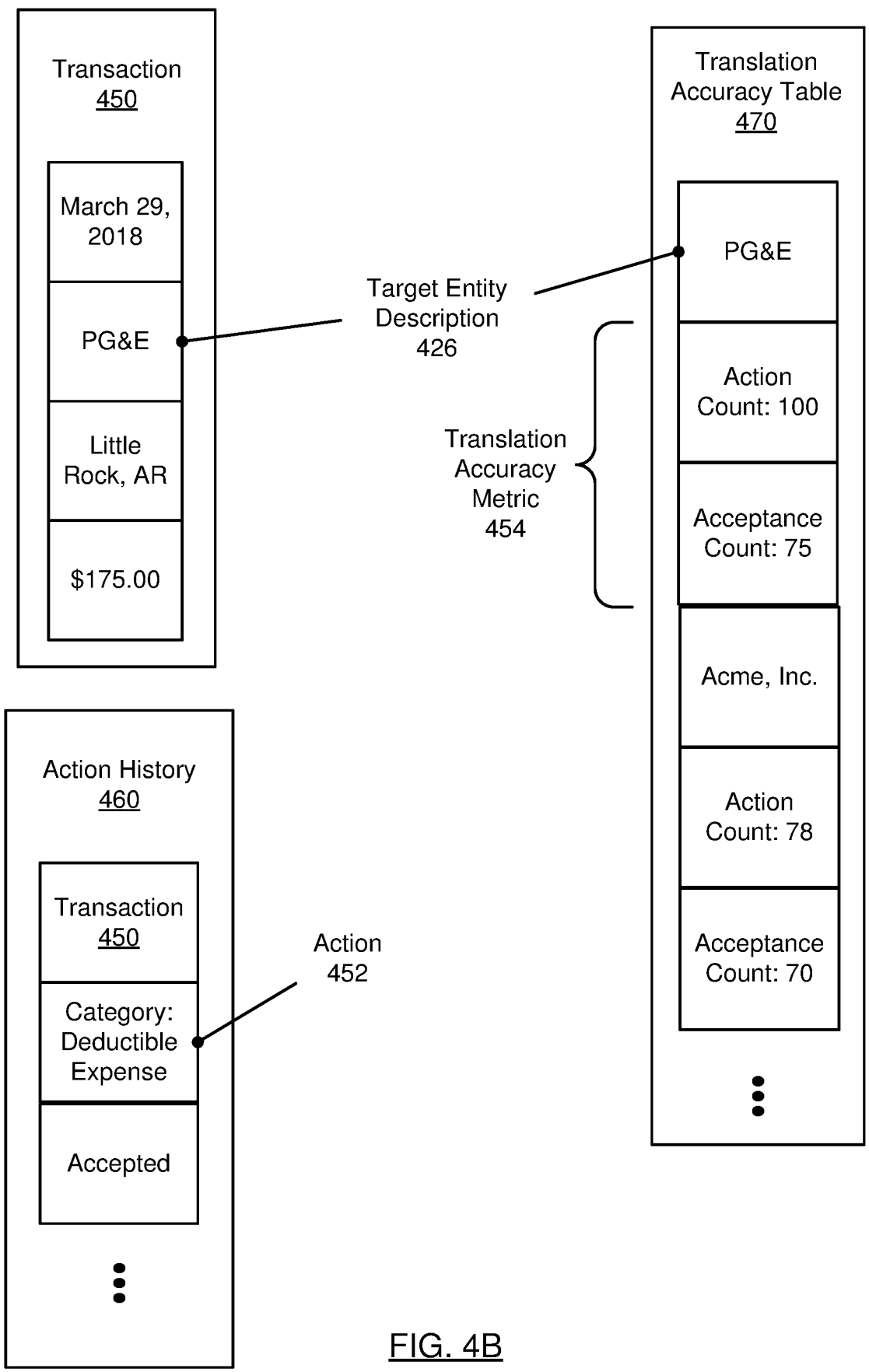
Figure 4C:
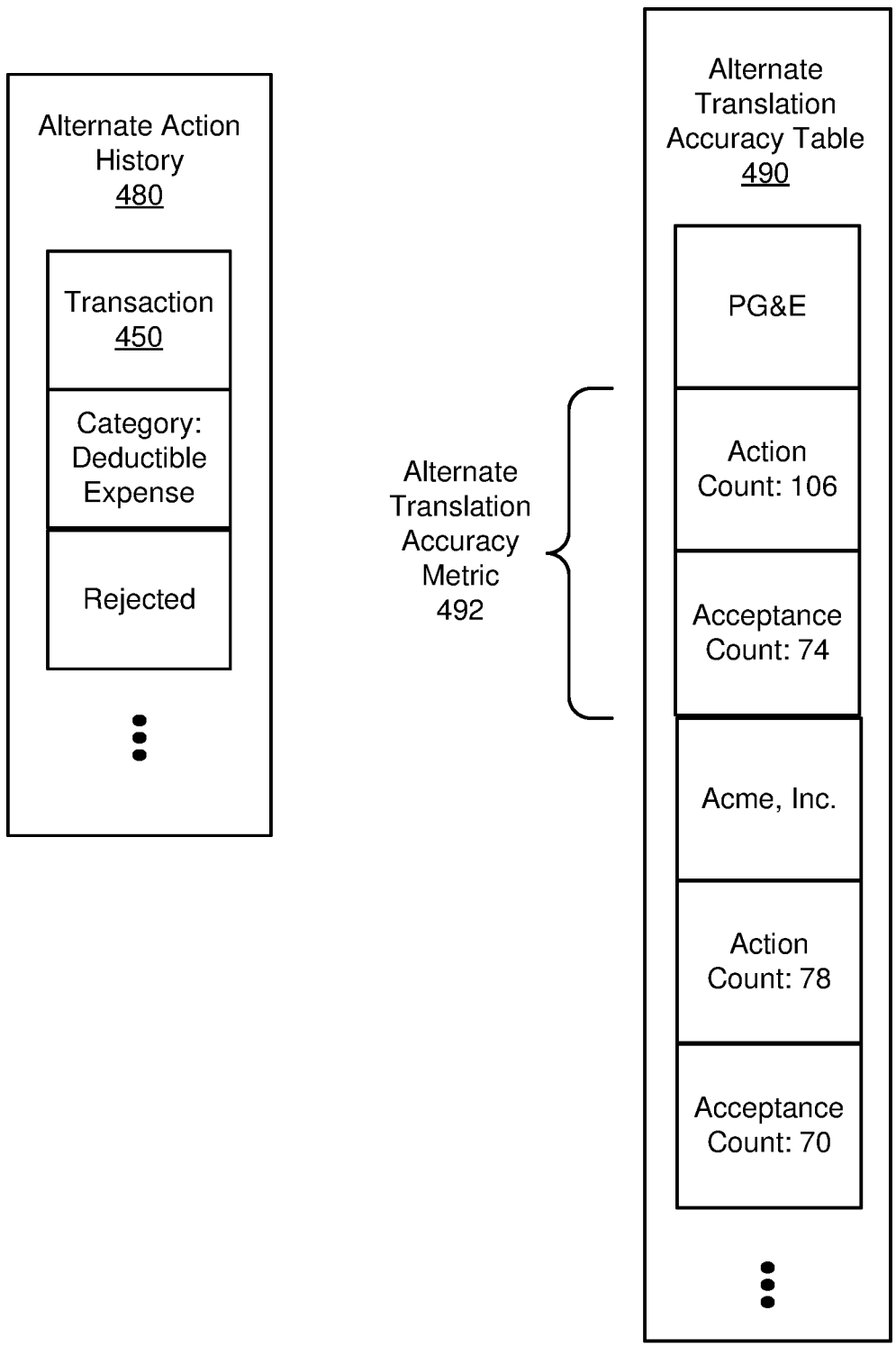

The following example is for explanatory purposes only and not intended to limit the scope of the invention. FIG. 4A, FIG. 4B, and FIG. 4C show an implementation example in accordance with one or more embodiments of the invention. FIG. 4A, FIG. 4B, and FIG. 4C illustrate the translation of a raw transaction description to a target entity description, and the conditions under which the target entity description may be added to, or removed from, the set of golden entity descriptions.

FIG. 4A shows an example of how the encoder and decoder models may operate. In this example, the translation manager ((124) in FIG. 1B) receives a raw transaction description "PG&,E 03-29-18 CEL3483Q83LU7 800-966-6236 AR WBGASNGOOCH UTILITIES" (400). The translation manager converts the raw transaction description (400) to a normalized transaction description "PG&,E 00-00-00 CEL000Q00LU0 000-000-0000 AR WBGASNG00CH UTILITIES" (402) by converting all digits in the raw transaction description (400) to zeroes. The translation manager then converts the normalized transaction description (402) to a feature vector (404), in this case, an n-gram of the normalized transaction description (402). Next, the translation manager determines that the feature vector (404) does not match any golden entity description.

In response to the feature vector (404) failing to match any golden entity description, the encoder model (410) encodes the feature vector (404) as a context vector (414) in multi-dimensional space, which is received by the decoder model (412). The output of the encoder model is ignored (416). Through several iterative time steps as shown by the arrow (418), the encoded context vector (414) is decoded to a transmitted mapping (422), which is related to the transmitted result "PG&E" (420). The new transmitted mapping (422) is added to the output mapping (424) to produce (i.e., predict) the target entity description (426) "PG&E".

FIG. 4B shows a scenario in which a user accepts an action performed on a transaction that includes the target entity description (426) that was translated in FIG. 4A. The translation manager generates a transaction (450) that includes the target entity description (426). A business management application (BMA) ((116) in FIG. 1A) then performs an action that assigns a category to the transaction (450). The action is displayed to a user via a graphical user interface (GUI) ((110) in FIG. 1A), who accepts the action. FIG. 4B shows that the acceptance of the action (452) performed on the transaction (450) is recorded in the action history (460) ((132) in FIG. 1B and FIG. 1C). Next, the translation manager updates a translation accuracy metric (454) for the target entity description (426) based on the acceptance of the action (452), as recorded in the translation accuracy table (470) ((128) in FIG. 1B). The translation accuracy metric (454) is updated by incrementing the action count to 100 and incrementing the acceptance count to 75. The translation manager then determines that the updated translation accuracy metric (454) satisfies a translation accuracy criterion that specifies an action count of at least 100, and an acceptance count to action count ratio of at least 0.7. Thus, the translation manager adds the target entity description (426) to the set of golden entity descriptions.

FIG. 4C shows an alternate scenario in which a user rejects the action (452) performed on the transaction (450) that includes the target entity description (426), as recorded in an alternate action history (480). In this alternate scenario, the translation manager determines that the feature vector ((404) in FIG. 4A) matches one of the golden entity descriptions. Thus, the matching golden entity description is used as the target entity description (426), and no machine translation is performed.

In the alternate scenario, the translation manager updates an alternate translation accuracy metric (492) for the target entity description (426) based on the rejection of the action (452). The alternate translation accuracy metric (492) is updated by incrementing the action count to 106 without incrementing the acceptance count, which remains at 74, as recorded in an alternate translation accuracy table (490). The translation manager then determines that the updated translation accuracy metric (454) violates the translation accuracy criterion that specifies an action count of at least 100, and an acceptance count to action count ratio of at least 0.7 (since the ratio of the acceptance count to the action count has now dipped below 0.7). Thus, in the alternate scenario, the translation manager removes the target entity description (426) from the set of golden entity descriptions.

Figure 5A:
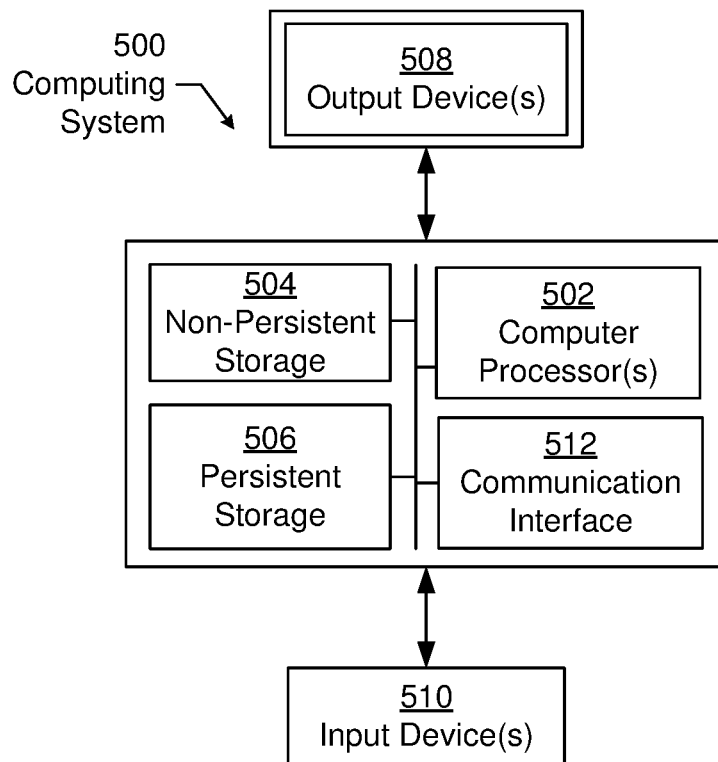
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
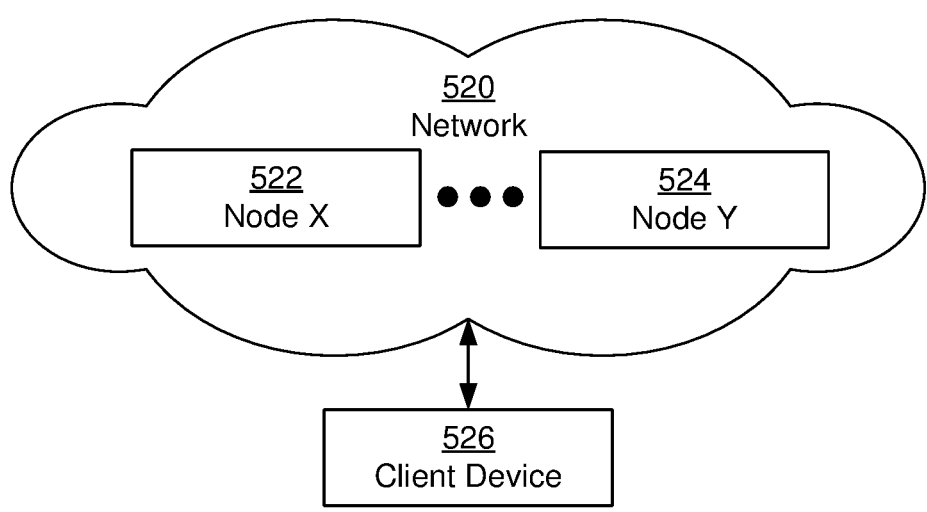

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
   generating a first source transaction description;
   determining that the first source transaction description does not match any entity description in a plurality of golden entity descriptions;
   in response to determining that the first source transaction description does not match any entity description in the plurality of golden entity descriptions, encoding, by an encoder model of a machine translation model executing on a computer processor, the first source transaction description to create a first context vector;
   decoding, by a decoder model of the machine translation model, the first context vector to predict a first target entity description;
   generating a first transaction comprising the first target entity description;
   detecting an acceptance, by a user, of a first action performed on the first transaction;
   in response to detecting the acceptance, updating a first translation accuracy metric for the first target entity description;
   determining that the updated first translation accuracy metric satisfies a translation accuracy criterion; and
   in response to determining that the updated first translation accuracy metric satisfies the translation accuracy criterion, adding the first target entity description to the plurality of golden entity descriptions.

2. The method of claim 1, wherein the first translation accuracy metric is based on:
   an action count that indicates a number of actions performed on transactions comprising the first target entity description, and
   an acceptance count that indicates a number of actions performed on transactions comprising the first target entity description that are accepted by users.

3. The method of claim 1, further comprising:
   displaying, to the user and via a graphical user interface (GUI), the first action; and
   receiving, from the user and via the GUI, the acceptance of the first action.

4. The method of claim 1, further comprising:

generating a second source transaction description;

determining that the second source transaction description matches a golden entity description in the plurality of golden entity descriptions;

generating a second transaction comprising the golden entity description;

detecting a rejection, by the user, of a second action performed on the second transaction;

in response to detecting the rejection, updating a second translation accuracy metric for the golden entity description;

determining that the updated second translation accuracy metric violates the translation accuracy criterion; and in response to determining that the updated second translation accuracy metric violates the translation accuracy criterion, removing the golden entity description from the plurality of golden entity descriptions.

5. The method of claim 1, further comprising:

obtaining, for each entity description in a dictionary, a plurality of transactions comprising the entity description;

determining, using a plurality of actions corresponding to the plurality of transactions, a translation accuracy metric for the entity description;

determining whether the translation accuracy metric satisfies a translation accuracy criterion; and in response to the translation accuracy metric satisfying the translation accuracy criterion:

obtaining a plurality of golden translations corresponding to the plurality of transactions, each of the plurality of golden translations comprising a source transaction description and the entity description; and adding the plurality of golden translations to training data for the machine translation model.

6. The method of claim 1, further comprising:

generating a second source transaction description;

encoding, by the encoder model, the second source transaction description to create a second context vector;

decoding, by the decoder model, the second context vector to identify tokens that are irrelevant to identifying a target entity description; and predicting a second target entity description by removing the irrelevant tokens from the second source transaction description.

7. A system, comprising:

a repository comprising a first source transaction description, a first target entity description, a first transaction comprising the first target entity description, a first translation accuracy metric for the first target entity description, and a plurality of golden entity descriptions;

a memory coupled to a computer processor;

a machine translation model executing on the computer processor and using the memory, the machine translation model comprising:

an encoder model configured to encode the first source transaction description to create a first context vector in response to a determination that the first source transaction description does not match any entity description in the plurality of golden entity descriptions; and a decoder model configured to decode the first context vector to predict the first target entity description; and a translation manager, executing on the computer processor and using the memory, configured to:

generate the first source transaction description;

make the determination that the first source transaction description does not match any entity description in the plurality of golden entity descriptions;

generate the first transaction;

detect an acceptance, by a user, of a first action performed on the first transaction;

in response to detecting the acceptance, update the first translation accuracy metric for the first target entity description;

determine that the updated first translation accuracy metric satisfies a translation accuracy criterion; and in response to determining that the updated first translation accuracy metric satisfies the translation accuracy criterion, add the first target entity description to the plurality of golden entity descriptions.

8. The system of claim 7, wherein the first translation accuracy metric is based on:

an action count that indicates a number of actions performed on transactions comprising the first target entity description, and an acceptance count that indicates a number of actions performed on transactions comprising the first target entity description that are accepted by users.

9. The system of claim 7, further comprising a graphical user interface (GUI) configured to:

display, to the user, the first action performed on the first transaction; and receive, from the user, an acceptance of the first action.

10. The system of claim 7, wherein the translation manager is further configured to:

generate a second source transaction description;

determine that the second source transaction description matches a golden entity description in the plurality of golden entity descriptions;

generate a second transaction comprising the golden entity description;

detect a rejection, by the user, of a second action performed on the second transaction;

in response to detecting the rejection, update a second translation accuracy metric for the golden entity description;

determine that the updated second translation accuracy metric violates the translation accuracy criterion; and in response to determining that the updated second translation accuracy metric violates the translation accuracy criterion, remove the golden entity description from the plurality of golden entity descriptions.

11. The system of claim 7, wherein the translation manager is further configured to:

obtain, for each entity description in a dictionary, a plurality of transactions comprising the entity description;

determine, using a plurality of actions corresponding to the plurality of transactions, a translation accuracy metric for the entity description;

determine whether the translation accuracy metric satisfies a translation accuracy criterion; and in response to the translation accuracy metric satisfying the translation accuracy criterion:

obtain a plurality of golden translations corresponding to the plurality of transactions, each of the plurality of golden translations comprising a source transaction description and the entity description; and add the plurality of golden translations to training data for the machine translation model.

12. The system of claim 7, wherein the translation manager is further configured to:
generate a second source transaction description; and
predict a second target entity description by removing, from the second source transaction description, tokens that are irrelevant to identifying a target entity description, wherein the encoder model is further configured to encode the second source transaction description to create a second context vector, and wherein the decoder model is further configured to decode the second context vector to identify the irrelevant tokens.

13. A non-transitory computer readable medium comprising instructions that, when executed by a processor, perform:

generating a first source transaction description;

determining that the first source transaction description does not match any entity description in a plurality of golden entity descriptions;

in response to determining that the first source transaction description does not match any entity description in the plurality of golden entity descriptions, encoding, by an encoder model of a machine translation model executing on a computer processor, the first source transaction description to create a first context vector;

decoding, by a decoder model of the machine translation model, the first context vector to predict a first target entity description;

generating a first transaction comprising the first target entity description;

detecting an acceptance, by a user, of a first action performed on the first transaction;

in response to detecting the acceptance, updating a first translation accuracy metric for the first target entity description;

determining that the updated first translation accuracy metric satisfies a translation accuracy criterion; and in response to determining that the updated first translation accuracy metric satisfies the translation accuracy criterion, adding the first target entity description to the plurality of golden entity descriptions.

14. The non-transitory computer readable medium of claim 13, wherein the first translation accuracy metric is based on:

an action count that indicates a number of actions performed on transactions comprising the first target entity description, and an acceptance count that indicates a number of actions performed on transactions comprising the first target entity description that are accepted by users.

15. The non-transitory computer readable medium of claim 13, wherein the instructions further perform:

displaying, to the user and via a graphical user interface (GUI), the first action; and receiving, from the user and via the GUI, the acceptance of the first action.

16. The non-transitory computer readable medium of claim 13, wherein the instructions further perform:

generating a second source transaction description;

determining that the second source transaction description matches a golden entity description in the plurality of golden entity descriptions;

generating a second transaction comprising the golden entity description;

detecting a rejection, by the user, of a second action performed on the second transaction;

in response to detecting the rejection, updating a second translation accuracy metric for the golden entity description;

determining that the updated second translation accuracy metric violates the translation accuracy criterion; and in response to determining that the updated second translation accuracy metric violates the translation accuracy criterion, removing the golden entity description from the plurality of golden entity descriptions.

17. The non-transitory computer readable medium of claim 13, wherein the instructions further perform:

obtaining, for each entity description in a dictionary, a plurality of transactions comprising the entity description;

determining, using a plurality of actions corresponding to the plurality of transactions, a translation accuracy metric for the entity description;

determining whether the translation accuracy metric satisfies a translation accuracy criterion; and in response to the translation accuracy metric satisfying the translation accuracy criterion:

obtaining a plurality of golden translations corresponding to the plurality of transactions, each of the plurality of golden translations comprising a source transaction description and the entity description; and adding the plurality of golden translations to training data for the machine translation model.

* * * * *

UNITED STATES PATENT AND TRADEMARK OFFICE
CERTIFICATE OF CORRECTION

PATENT NO. : 10,572,607 B1
APPLICATION NO. : 16/144863
DATED : February 25, 2020
INVENTOR(S) : Christopher Lesner et al.

Page 1 of 1

It is certified that error appears in the above-identified patent and that said Letters Patent is hereby corrected as shown below:

On the Title Page

Page 2, item (56) References Cited, occurring in the first reference cited under U.S. PATENT DOCUMENTS, "G06O 30/0201" should read -- G06Q 30/0201 --.

Signed and Sealed this
Ninth Day of June, 2020

Andrei Iancu
*Director of the United States Patent and Trademark Office*